United States Patent [19]
Kirkland

[11] 3,943,959
[45] Mar. 16, 1976

[54] TWO-WAY BALL VALVE

[75] Inventor: W. Dean Kirkland, Walnut Creek, Calif.

[73] Assignee: Cutter Laboratories, Inc., Berkeley, Calif.

[22] Filed: Sept. 4, 1974

[21] Appl. No.: 503,119

[52] U.S. Cl. .............................. 137/238; 251/315
[51] Int. Cl.² .......................................... F16K 51/00
[58] Field of Search ..................... 137/237–241; 251/175, 182, 304, 309, 315, 317

[56] References Cited
UNITED STATES PATENTS

| | | | |
|---|---|---|---|
| 3,039,484 | 6/1962 | Bredtschneider | 251/315 X |
| 3,488,033 | 1/1970 | Priese | 251/175 X |
| 3,525,352 | 8/1970 | Jensen | 137/238 |
| 3,773,291 | 11/1973 | Grauer | 251/315 |

Primary Examiner—Martin P. Schwadron
Assistant Examiner—Richard Gerard
Attorney, Agent, or Firm—Gardiner, Sixbey, Bradford & Carlson

[57] ABSTRACT

A two-way ball valve including a housing having an open interior chamber or space with opposed inlet and outlet openings, apertured ball seats operatively positioned in the housing at the junctures of the inlet and outlet openings, a ball in the chamber floatingly seated between the ball seats and in liquid sealing engagement therewith, an axial flow bore through the ball, the ball being rotatably positionable to open and closed positions, and a large bore or opening in the body of the ball in the nature of a side channel intercommunicating the axial flow bore and the interior space in the housing, and with the valve in open position permitting fluid to circulate freely within the housing to flush the housing space and thereby prevent formation of contaminated dead spaces in the valve.

8 Claims, 4 Drawing Figures

TWO-WAY BALL VALVE

BACKGROUND OF THE INVENTION

Ball valves as presently known present a number of advantages over other types of valves. Ball valves permit immediate flow or shut-off with a quarter turn of a handle associated with the ball. Such ball valves are leak tight, do not require lubrication, and ball seating rings within the valve housing can be easily and quickly replaced. The ball member per se is also easily replaced. Ball valve constructions utilize a small number and simple design of parts which constitute the valve, and such valves are relatively inexpensive and easily manufactured.

When employed in equipment where even a small amount of contamination of the material flowing through the valve cannot be tolerated, ball valves present a disadvantage. Situations especially in the production of pharmaceuticals, parenteral solutions and foodstuffs are especially significant as regards elimination of such contamination. The contamination in ball valves normally occurs in that the space surrounding the ball inside the housing fills with fluid when the ball is rotated in order to effect a closed or an open position. As the valve is opened from a closed position, a small portion of this trapped fluid leaves the space to exit from the valve while at the same time an equal small portion of piped fluid enters this space from the incoming side of the valve. It has been found that the bulk of this trapped fluid remains in this space between the ball and the housing and cannot be entirely removed unless the valve is completely disassembled. This entrapped fluid can contaminate subsequent batches of a solution with substances which were in a previously piped solution if the valve is operated when the subsequent batches pass through it. Microorganisms and pyrogens which can develop in this entrapped fluid cannot be removed in a normal flushing operation and these can also contaminate solutions subsequently valved.

It is this possible or inherent contamination possibility that the present invention is designed to eliminate. Some previous ball valve structures have incorporated features which might be considered as broadly analogous to the solution presented by the present ball valve. The ball in standard two-way ball valves is provided with a wide axial flow bore. The drawback as referred to above, broadly speaking, is eliminated in the present invention by providing a ball in which a portion of the ball body is removed to provide communication between the bore and the space surrounding the ball. The present ball when utilized in a two-way ball valve provides a self-flushing feature to eliminate this contamination problem. The present structure is different from anything known in the prior art.

U.S. Pat. No. 3,148,693 discloses a ball which must have two trunnions secured to the side surfaces of the ball so that the ball can be pulled up by hooks against a ball seat. The sealing surface in this ball faces the direction of flow and there is a greater likelihood that leaks will develop when higher fluid pressures are experienced. to minimize this situation a screw threaded collar must be utilized and screwed up more tightly and this results in increased wear on the seating ring. The present ball eliminates the necessity for the trunnions and is not pulled in any one direction but merely "floats" between two seating rings so that minimal wear on the seating rings occurs. Additionally the seating surface of the present ball is away from the direction of flow and the pressure of the fluid in effect forces the ball against the seating ring on the outflow side, in the closed position of the valve. This ensures a better sealing contact being made between the ball and the seating ring.

U.S. Pat. No. 3,333,813 discloses a ball having an opening adapted to permit fluid to flow from a central channel into a valve housing space but is entirely inadequate to provide self-flushing or flow of fluid into and from this housing space. The purpose of this channel is merely to allow fluid to enter the space in the housing to equalize the pressure against the seating rings. The valve structure of this patent also utilizes two trunnions in order to maintain the ball in a stable position within the housing.

The present invention only now provides a ball valve construction which does not allow formation of contaminated dead spaces and results in outstanding advantages to processer of, for example, pharmaceuticals, food and beverages.

BRIEF DESCRIPTION OF THE INVENTION

The present invention teaches a two-way ball valve which includes a housing having an open interior chamber or space with opposed inlet and outlet openings. Apertured ball seats in the nature of seating rings are operatively positioned in the housing at the junctures of the inlet and outlet openings. The ball per se is operatively mounted in the chamber and is floatingly or unsupportedly seated between the ball seats and in liquid sealing engagement therewith. An axial flow bore is provided through the ball as is usual, and the ball is rotatably positionable to open and closed positions to permit flow through the valve. The present invention additionally provides a large bore or opening in the body of the ball in the nature of a side channel intercommunicating the axial flow bore and the interior space in the housing. Substantially all the solid portion of the ball body is removed in creating this side channel except for those portions which are essential for seating against the seating rings of the inflow and outflow sides of the housing, the portion which effects closure, and the portion which is slotted for receiving a key of a handle shaft. In operation, when in open position the fluid flows through the axial bore and also flows through the side channel connecting the axial bore with the space within the housing. This effectively allows fluid to circulate freely within the housing so as to flush the housing space at all times when the valve is in open position.

Another advantage of the invention, and which further distinguishes over U.S. Pat. No. 3,333,813, is that when the ball of the present construction is in closed position, any pressure buildup within the housing, such as might occur for example when the valve is heated to loosen a frozen or stuck valve, will be dissipated since the side channel is in communication with the inflow pipe. A buildup of pressure in the prior art valve of that patent could damage the valve.

Additional objects, advantages and features of the invention will be more readily apparent from the following detailed description of an embodiment thereof when taken together with the accompanying drawings in which.

Figure 1:
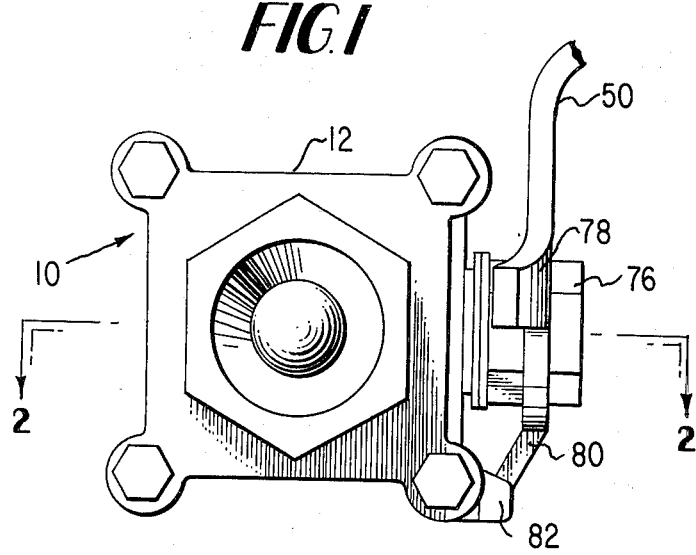
FIG. 1 is an end view of a valve embodying the present invention showing the valve in closed position and looking toward the outflow end of the valve.

Referring now in greater detail to the drawings a valve structure in accordance with the invention is generally designated 10 and includes a housing 12 of a usual construction including a central body portion 14 and end plates 16 and 18 attached to central body portion 14 by bolts 20. The central body portion has an interior chamber or space 22 which extends therethrough. End plate 16 is provided with an internally threaded inlet coupling 24 in the nature of an upstanding collar or extension of the plate and which at the base is tapered inwardly at 26 and terminating in an inlet opening 28. End plate 18 in like manner is provided with an outlet coupling 30 which is internally threaded and has tapered portion 32 and the terminal outlet opening 34.

Apertured ball seats or ball seating rings 36 and 38 are positioned in interior chamber 22 proximate the junctures thereof with inlet and outlet openings 28 and 34 respectively. Seal rings 40 and 42 are interposed between the seating rings and the end plates to effect liquid tight seal therebetween and the central body portion. The seal rings and ball seats or seating rings can consist of any suitable material such as a resilient plastic of known types. Good wear, resiliency and lubricating characteristics are desirable. The inner portions or faces of the seating rings are provided with spherical shaped portions as at 44 of a shape and size commensurate with a ball generally designated 46 seated between the seating rings.

Figure 2:
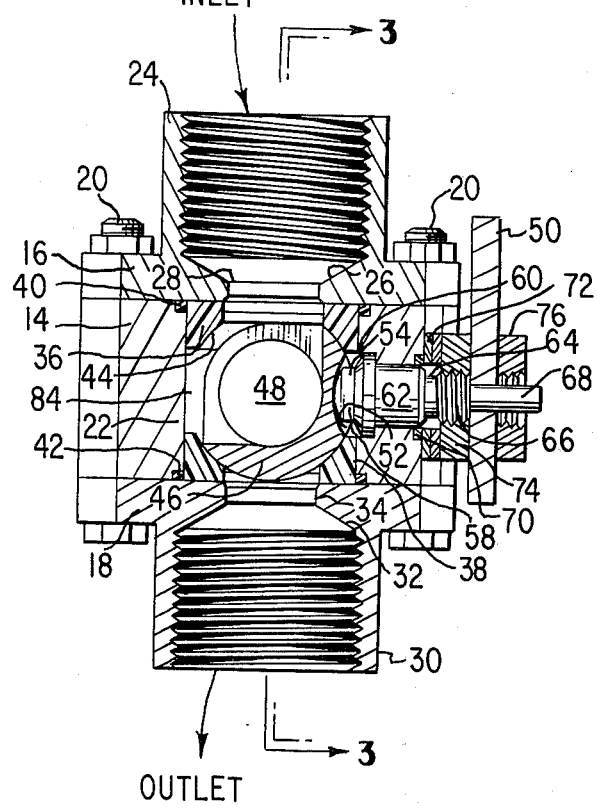
FIG. 2 is a sectional view taken on line 2, 2 of FIG. 1.
Figure 3:
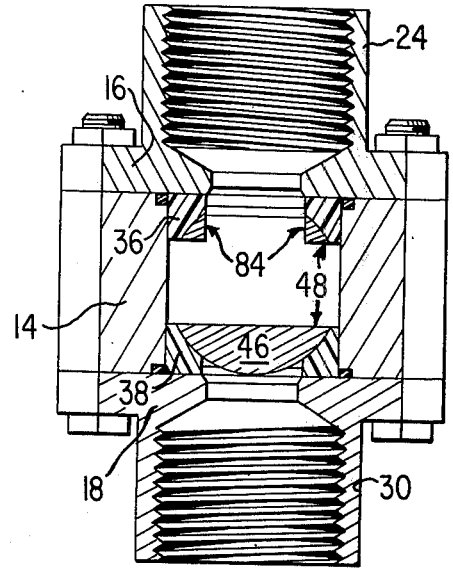
FIG. 3 is a sectional view taken on line 3, 3 of FIG. 2 at right angles thereto.
Figure 4:
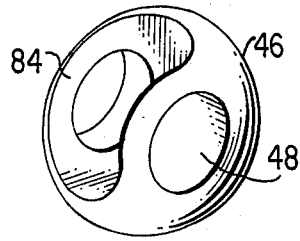
FIG. 4 is a perspective view of the structure of the ball per se as incorporated in the valve.

The ball as shown in greater detail in FIG. 4 generally includes a usual axial flow bore 48 therethrough and the ball, as is usual, is rotatable through a quarter turn by manipulation of handle 50 to align axial bore 48 with inlet and outlet openings 28 and 34 for flow through the valve. To effect rotation of the ball to the opening and closing positions a curvilinear recess 52 is provided in the exterior of the ball which is in mating engagement with a key 54 of similar general configuration which is formed on the end of a shaft generally designated 56 and which extends outwardly of the housing as shown in FIG. 2. The shaft further includes a collar 58 in operative engagement within recess 60 which serves to confine and journal the shaft for rotation. Outwardly of collar 58 is a cylindrical portion 62, a reduced neck portion 64, a cylindrical threaded portion 66 and a flattened threaded shaft portion 68. Operatively mounting and securing the shaft with respect to the housing is a plastic washer or bushing 70 engaging around the periphery of cylindrical portion 62, washers 72 and nut 74 engaging with cylindrical threaded portion 66. Handle 50 operatively engages by means of a slot or the like over the flattened shaft 68 and is secured thereon by means of a nut 76. The handle as shown includes stop abutments 78 and 80 engageable with a stop abutment means or stud 82 provided on the housing in a usual manner to determine and indicate open and closed positions of the valve.

The ball 46 in addition to the axial bore 48 is provided with a large bore or opening 84 which extends from the axial bore 48 to the exterior of the ball body. This large bore or opening in the nature of a side channel intercommunicates the axial flow bore and the interior space in the housing. It will be noted that all the solid portion of the ball body has been removed except for those portions which are essential for seating against the seating rings of the inflow and outflow sides of the housing, the portion which effects closure, and the portion which is slotted for receiving the key of the handle shaft. In open position, fluid flows through the axial bore and also flows through the side channel connecting the axial bore with the space within the housing. This effectively allows fluid to circulate freely within the housing so as to flush the housing space at all times when the valve is in the open position. This bore as shown in the drawings is essentially oval shaped at the periphery of the ball and the ball can be made of non-corrosive metal or plastic and can be readily machined or molded to provide the desired configuration for the self-flushing characteristic. Manifestly changes in size and shape can be made providing that the size and direction are appropriate to provide the self-flushing effect. The preferred configuration is that as shown in the drawing.

While a preferred embodiment has been shown and described herein manifestly minor changes in details can be effected without departing from the spirit and scope of the invention as defined in and limited solely by the appended claims.

I claim:

1. A ball adapted for operable seating in liquid sealing floating engagement between opposed ball seating rings respectively positioned at inlet and outlet openings in a ball valve housing with the seating rings having inner spherical shaped ball engaging portions, said ball having an axial flow bore therethrough and being rotatable within said housing to align said axial bore between the inlet and outlet openings in an open valve position and to a non-aligned valve closing position, said ball additionally including a side opening channel intercommunicating said axial bore and the interior space of said housing, said side opening channel being defined by and between rotatably angularly spaced coacting surfaces respectively extending tangentially to and from the inner surface of said bore at right angles to the axis of said axial bore and from points on said inner surface beyond said axis with respect to the peripheral exterior of said side opening, the side and axial bore openings of said ball being peripherally spaced and the remaining areas therebetween providing two peripheral spaced curvilinear bridges on the surface of said ball constituting seating and sealing engaging surfaces for coacting with said seating ring ball engaging portions, and defining portions of the outer peripheries of said axial flow bore and said side opening channel, said channel being operable with the valve in open position to open the interior space in the housing to inlet flow for flushing the space and thereby prevent formation of contaminated dead spaces in the housing.

2. A ball as claimed in claim 1, said side opening in said ball in the nature of a channel being formed by removal of a major portion of the ball body, with the exception of those portions essential for seating against the cooperating opposed ball seating rings on the inlet and outlet sides of the interior space, the portion which effects closure, and a portion slotted for coaction with means for rotating the ball to open and closed positions.

3. A ball as claimed in claim 2, said side opening being substantially oval shaped in cross-section.

4. In a ball valve including a housing, an interior chamber in the housing, inlet and outlet openings to the chamber, ball seating rings juxtaposed to the openings, a ball having an axial flow bore therethrough seated between the seating rings and rotatable to open and closed positions, the improvement comprising:

a side opening in the body of said ball of large dimensions intercommunicating with and at a right angle to the axis of said axial flow bore, said side opening having a chordal extent greater than a right angle with respect to said axis, and with said ball in open position intercommunicating and opening the interior space of said chamber to inlet flow for flushing said space and thereby preventing formation of contaminated dead spaces in the housing.

5. A two way ball valve comprising:
a. a housing including
  i. an interior chamber;
  ii. inlet and outlet openings communicating respectively with said chamber; and
  iii. apertured ball seats operatively positioned at the junctures of said inlet and outlet openings;
b. a ball in said interior chamber operatively engaged and seated between said apertured ball seats, said ball including:
  i. an axial flow bore therethrough;
  ii. said ball having an open side communicating with and at a right angle to the axis of said axial bore and with a chordal extent extending beyond said axis and at a right angle thereto;
c. said ball being floatingly seated between said ball seats, in liquid sealing engagement therewith, and rotatably positionable selectively to a closed position, and to an open position wherein liquid flow from said inlet opening passes into and through said axial bore and said outlet opening and through said side opening into the interior space of said interior chamber for flushing matter therefrom and expelling it with fluid flowing through said outlet opening.

6. A two-way ball valve as claimed in claim 5, said apertured ball seats comprising seating rings having spherical shaped seating recesses therein for mating coaction with the periphery of said ball.

7. A two-way ball valve as claimed in claim 5, said side opening in said ball in the nature of a channel and being formed by removal of a major portion of the ball body, with the exception of those portions essential for seating against the cooperating opposed ball seating rings on the inlet and outlet sides of the interior space, the portion which effects closure, and a portion slotted for coaction with means for rotating the ball to open and closed positions.

8. A two-way ball valve as claimed in claim 7, said side opening with said ball in closed position being open to inlet flow into said housing for increased seating pressure of said ball against the seating ring at the outlet side of said valve.

* * * * *